(12) United States Patent
Rammig et al.

(10) Patent No.: US 6,966,939 B2
(45) Date of Patent: Nov. 22, 2005

(54) MULTI-LAYER FILTER STRUCTURE AND USE OF A MULTI-LAYER FILTER STRUCTURE

(75) Inventors: Jürgen Rammig, Neuendettelsau (DE); Uwe Schmierer, Dietenhofen (DE); Ulrich Hornfeck, Naila (DE); Roland Straub, Schwarzenbach/Saale (DE)

(73) Assignees: Branofilter GmbH, Dietenhofen (DE); Sandler AG, Schwarzenbach/Saale (DE)

( * ) Notice: Subject to any disclaimer, the term of this patent is extended or adjusted under 35 U.S.C. 154(b) by 44 days.

(21) Appl. No.: 10/420,862

(22) Filed: Apr. 23, 2003

(65) Prior Publication Data

US 2004/0211160 A1 Oct. 28, 2004

(30) Foreign Application Priority Data

May 16, 2002 (DE) ......................................... 102 21 694

(51) Int. Cl.$^7$ ................................................ B32B 5/18
(52) U.S. Cl. ............................. 55/486; 55/527; 55/382; 55/DIG. 2; 55/DIG. 39; 55/485; 55/487; 15/347; 15/352; 95/57; 95/78; 95/287; 96/15; 96/69
(58) Field of Search ...................... 55/527, 382, DIG. 2, 55/DIG. 39, 485–487; 15/347, 352; 95/57, 78, 287; 96/15, 69

(56) References Cited

U.S. PATENT DOCUMENTS

| | | | |
|---|---|---|---|
| 4,164,400 A | | 8/1979 | Wald |
| 4,702,940 A | | 10/1987 | Nakayama et al. |
| 4,714,647 A | | 12/1987 | Shipp et al. |
| 5,240,484 A | * | 8/1993 | Genovese et al. ............. 96/226 |
| 5,647,881 A | * | 7/1997 | Zhang et al. .................. 55/382 |
| 6,156,086 A | * | 12/2000 | Zhang .......................... 55/382 |
| 6,171,369 B1 | * | 1/2001 | Schultink et al. ............... 95/57 |
| 6,183,536 B1 | * | 2/2001 | Schultink et al. ............... 95/57 |
| 6,372,004 B1 | * | 4/2002 | Schultink et al. ............. 55/382 |
| 6,514,325 B2 | * | 2/2003 | Cox et al. ...................... 96/69 |
| 6,585,794 B2 | * | 7/2003 | Shimoda et al. .............. 55/527 |

FOREIGN PATENT DOCUMENTS

| | | |
|---|---|---|
| DE | 1 937 534 | 4/1966 |
| DE | 89 10 579.6 | 12/1989 |
| DE | 42 12 112 | 10/1993 |
| DE | 693 20 027 | 11/1994 |
| DE | 199 56 368 | 6/2001 |
| EP | 0 622 101 | 11/1994 |
| EP | 0 904 819 A1 | 3/1999 |
| EP | 0 96 645 A2 | 12/1999 |
| EP | 0 960 645 | 12/1999 |
| JP | 57-078917 | 5/1982 |

OTHER PUBLICATIONS

Patent Abstract of Japan, Publication #57059614, Apr. 10, 1982, "Filter Cloth for Air Cleaner," Mitsunari Ken et al.
Patent Abstract of Japan, Publication #2000201869, Jul. 25, 2000, "Dust Collection Bag for Vacuum Cleaner," Nishiura Eiichi et al.

* cited by examiner

Primary Examiner—Minh-Chau Pham
(74) Attorney, Agent, or Firm—Browdy and Neimark, P.L.L.C.

(57) ABSTRACT

The invention describes a multi-layer filter structure and the use of a multi-layer filter structure for the dust removal from gases, wherein a coarse dust filter layer, a fine dust filter layer, and a support layer are disposed behind one another in the direction from the inflow side to the outflow side, and which is designed such that the fiber diameter distribution within the coarse dust filter layer and fine dust filter layer has a gradient, and that the fiber diameters of the coarse dust filter layer and fine dust filter layer continually decrease from the inflow side to the outflow side.

This multi-layer filter structure may be used in a filter cassette for industrial dust removal, as well as in a stationary or mobile home dust cleaning device.

20 Claims, 5 Drawing Sheets

MULTI-LAYER FILTER STRUCTURE AND USE OF A MULTI-LAYER FILTER STRUCTURE

BACKGROUND OF THE INVENTION

1. Prior Art

To increase the efficiency of filter media, for example filter units in stationary or mobile dust removal systems or also in ventilation and air conditioning systems, numerous efforts have been made in the past.

In DE 19919809 A1, a dust filter bag for use in vacuum cleaners is described, which consists of at least one nonwoven layer and at least one support material layer and which is suitable for the efficient removal of fine dust particles without significantly reducing the cleaning power of the vacuum cleaner. However, due to the relatively thin filter paper layer, nanofiber layer, and meltblown layer that are used, the collection capacity of the material is low as dust particles can collect only in the surface region of the filter.

A multi-layer vacuum cleaner filter bag with a very good dust removal action is also revealed in EP 0960645 A2. The layer structures with their varied designs generally contain one wet-laid or dry-laid filter paper layer, or one voluminous meltblown nonwoven, or one spunblown nonwoven, or one fine-denier spun-laid nonwoven.

A shortcoming is its complex structure of different materials, which necessitates greater expenditures during the production.

EP 0822775 B1 presents a shock resistant vacuum cleaner filter bag containing a filter laminate that is composed of an outer support layer, a fibrous nonwoven filter layer, and an inner diffusion layer. The nonwoven filter layer is preferably a meltblown electret microfiber nonwoven web, whereas the support and diffusion layer may be a spun-laid nonwoven or a hardened carded web of fabric.

They all have in common the idea of utilizing, in addition to a stabilizing layer, a plurality of filter layers that have filtering capacities of varying degrees of filtration efficiency, i.e., each layer filters out particles of a certain size from the dust mixture. The shortcoming is that two different fractions of dust particles are located directly next to one another at each boundary surface between the individual filter layers since the individual filter layers are filled with dust from the inflow to the outflow side.

2. Object and Summary of the Invention

FIG. 1 shows the distribution of the dust particles within such a multi-layer filter according to the prior art. An explanation of the reference letters can be found in the list of reference letters.

This distribution of the dust collection that is characteristic for filter media produced according to the prior art, of the type used for vacuum cleaner bags according to the preamble causes a significant increase in the differential pressure, particularly at the beginning and towards the end of their time in use. This results in a reduced cleaning power of the vacuum cleaner and, hence, also in a reduced dust collection efficiency.

The invention, therefore, has as its object to provide a multi-layer filter material that avoids the above shortcomings of the prior art. This object is met in such a way that a multi-layer filter structure (E) is used for the dust extraction from gases, wherein a coarse dust filter layer (A), a fine dust filter layer (B) and a support layer (C) are disposed one after another in the direction from the inflow side to the outflow side, which are designed such that the fiber diameter distribution within the coarse dust filter layer (A) and fine dust filter layer (B) has a gradient and the fiber diameters of the coarse dust filter layer (A) and fine dust filter layer (B) continually decrease from the inflow side to the outflow side.

To attain the highest possible air flow rate as the dust load increases, it is necessary that the dust is deposited as homogeneously as possible across the entire thickness of the filter structure and that no boundary surfaces are contained in the filter structure at which an accumulation of dust particles results in a blockage of the entire structure.

This is attained with a continuous decrease in pore size from the inflow side to the outflow side across all layers forming the filter material, without the presence of clearly noticeable transitional areas.

The pores in a nonwoven exist as hollow spaces between the fibers, i.e., the smaller the selected fiber diameter and/or the higher the selected compaction of the nonwoven, the smaller the resulting pore size. To prevent an abrupt transition due to different pore sizes in the region of the contacting surfaces of the filter layers it is necessary that the contacting filter regions have approximately the same fiber diameter.

The fractional distribution of the deposited dust particles across the entire cross section of the filter medium is made possible in such a way that the filter medium has increasingly smaller pores in each filter layer from the inflow side to the outflow side, so that large dust particles are absorbed by corresponding large pores and small dust particles by small pores.

This desired progressive filter design is attained by forming a fiber diameter gradient, as well as by selecting special forming and hardening methods for the nonwovens and combining suitable nonwovens.

DETAILED DESCRIPTION OF THE PREFERRED EMBODIMENT(S) OF THE INVENTION

Figure 1:
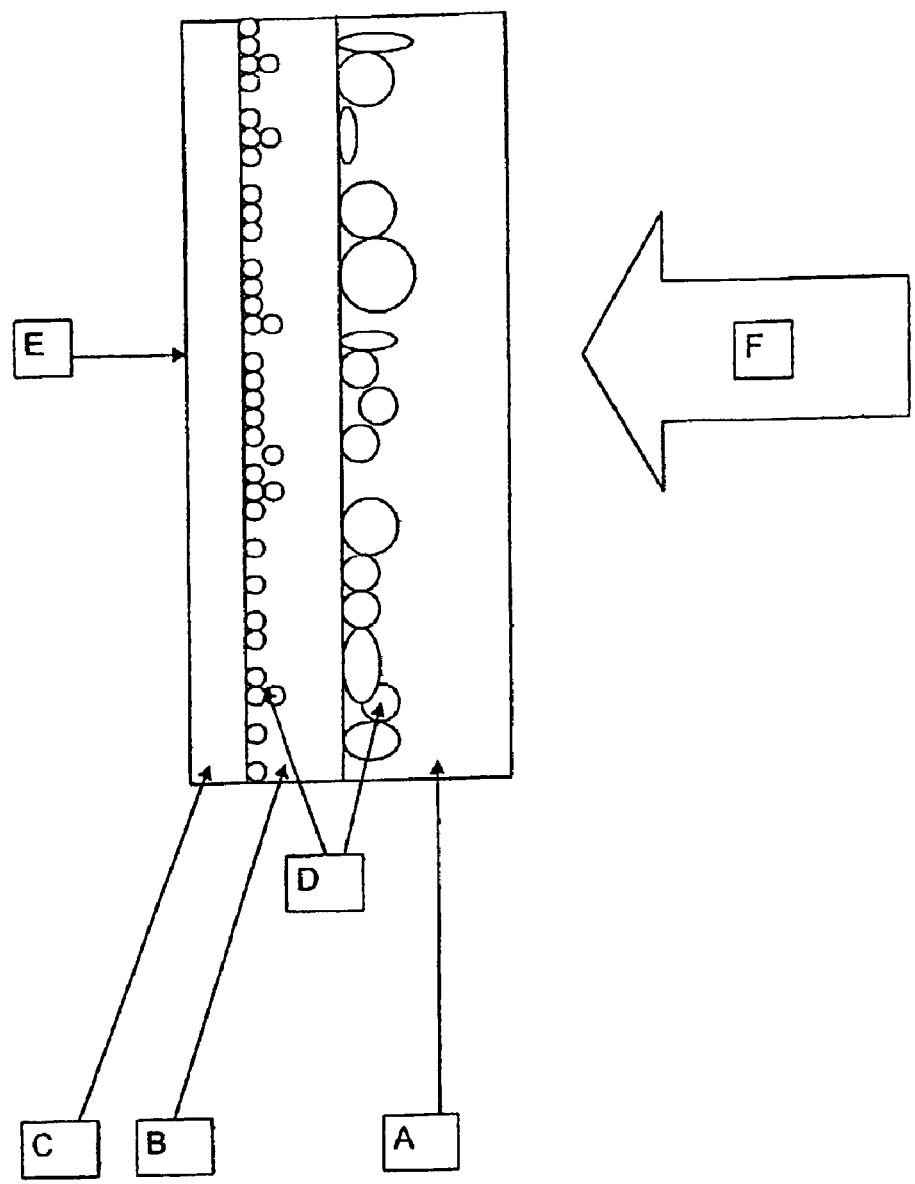
FIG. 1 is a pictorial view showing the distribution of dust particles within a multi-layer filter according to the prior art.
Figure 2:
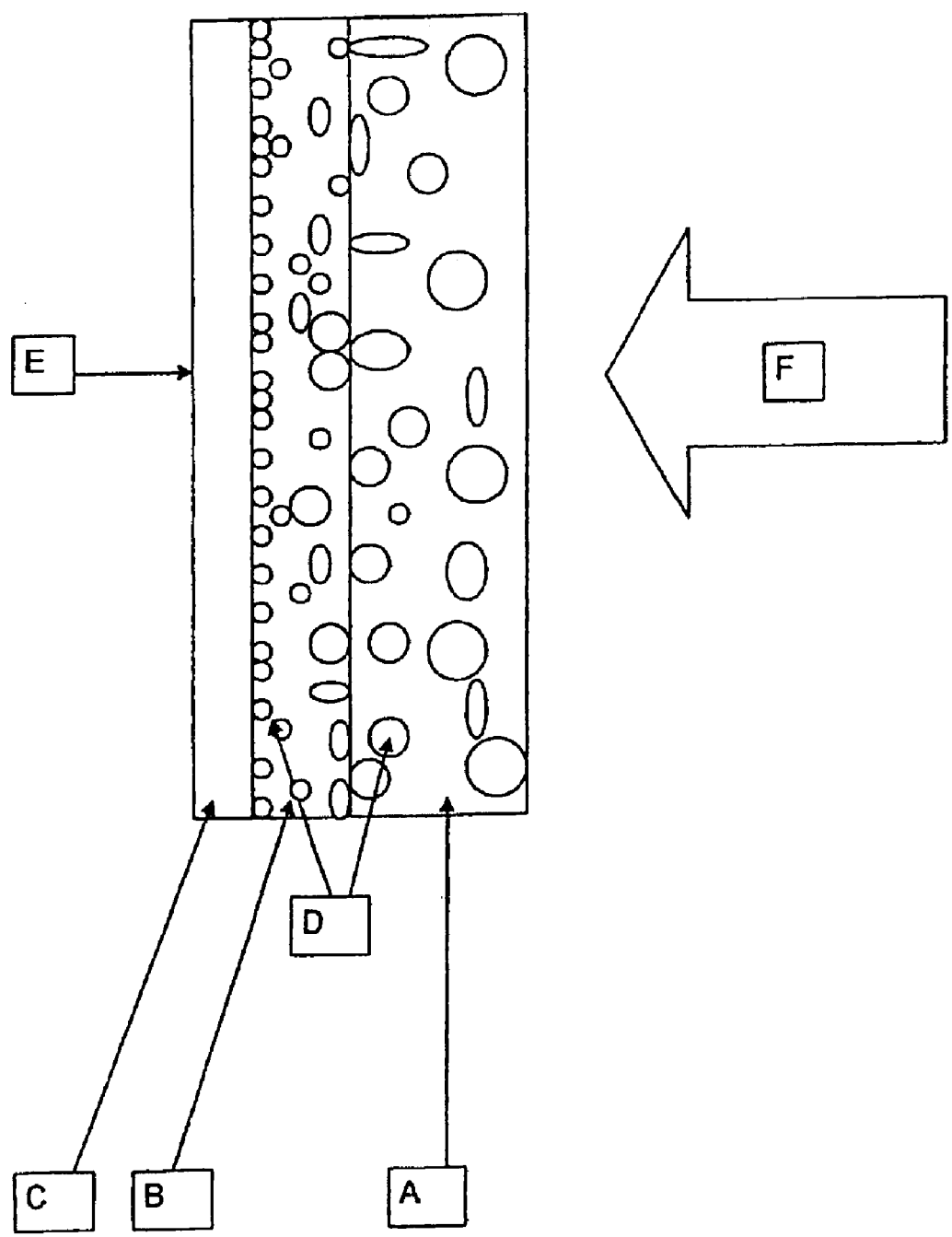
FIG. 2 is a pictorial view showing the characteristic distribution of dust particles within a coarse dust filter layer and fine dust filter layer on the inventive multi-layer filter structure in cross section.

FIG. 2 shows the characteristic distribution of the dust particles (D) within the coarse dust filter layer (A) and fine dust filter layer (B) on the inventive multi-layer filter structure (E) in the cross section.

Figure 3:
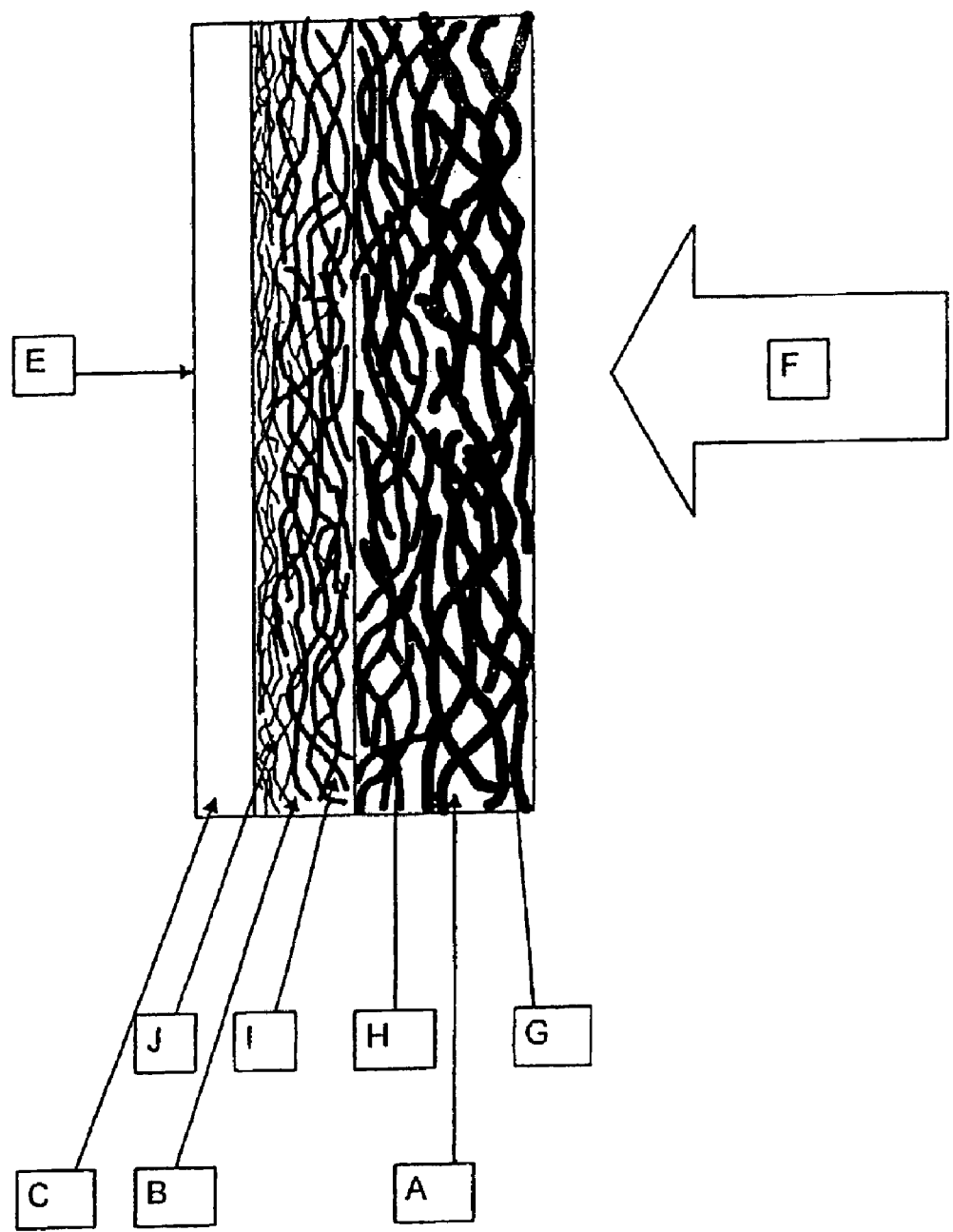
FIG. 3 is a pictorial view showing the inventive progressive filter structure of the coarse duet filter layer (A) and fine dust filter layer in cross section.

In FIG. 3 the inventive progressive filter structure (E) of the coarse dust filter layer (A) and fine dust filter layer (B) is shown in the cross section.

For the inventive multi-layer filter structure (E) a filter medium is used as the coarse dust filter layer (A), which consists, for example, of a carded nonwoven that is needled on one side and thermally hardened, and which is composed of randomly oriented curled staple fibers comprising a first synthetic staple fiber with a first fiber fineness and at least one second synthetic staple fiber with a second fiber fineness.

The desired gradient is attained in such a way that the arrangement of differently fine staple fibers is selected so that the more coarse staple fibers (G) lie on the side facing the inflow direction (F), whereas the finer staple fibers (H) are located on the side facing away from the inflow direction (F). An additional mechanical hardening in the form of a needling, which is performed only from the side on which the fine staple fibers are located, results in an additional densification in this area and thus in a more pronounced desired gradient.

The fine dust filter layer (B) may be a microfiber mat of thermoplastic polymers that is produced according to the meltblown process and which also has a gradient, i.e., the average fiber diameter of the microfibers decreases across the cross section from the inflow side in the direction of the outflow side. Within the fine dust filter layer (B), fiber bundles (I) also are located on the side facing away from the inflow direction, and the finer microfibers (J) are located on the side facing away from the outflow side.

As a support layer (C) for the inventive multi-layer filter structure (E), a spun-laid nonwoven is used that is manufactured of thermoplastic synthetic fibers with a homogenous fiber distribution. However, it serves only to provide a mechanical stabilization and has no influence whatsoever on the filtering properties of the overall structure.

The individual layers are bonded, depending on the given design, mostly along the edges of the given filter structure, either by means of an adhesive or by ultrasound or hydrodynamic lamination or hot pressing, or by sewing the edge regions of the dust filter bag together.

The invention will be explained in detail based on the following embodiment.

Material structure of the inventive multi-layer filter structure (E):
  Coarse dust filter layer (A): Carded, thermally hardened staple fiber nonwoven that is needled on one side, basis weight: 60 g/m²
  Fine dust filter layer (B): Microfiber nonwoven, produced according to the meltblown process, basis weight 45 g/m²
  Support layer (C): Spun-laid nonwoven, produced according to the spunbond process, basis weight: 30 g/m²

The production of the individual layers that are required for the inventive filter structure is performed as follows.

The carded staple fiber nonwoven that forms the coarse dust filter layer (A) is produced according to known carding processes, also with the aid of crosslappers. Downstream from this process is a needling machine that allows a one-sided needling. In the process, the nonwoven is not completely needled through on the outflow side, but rather only a one-sided densification of the nonwoven is attained. The pore size on the needled side is smaller than that on the non-needled side. A pore size gradient is thus created.

The selection of the utilized fibers, especially their fiber diameters, also has significant impact on the formation of the gradient and, hence, on the inventive filter structure.

It has proven advantageous to build up the staple fiber nonwoven with uniform polymers. Fibers of polyethylene terephthalate are preferred in this context, however, it is also possible to utilize other thermoplastic fiber materials.

The following mixture of the staple fiber nonwoven forming the coarse dust filter layer (A) has proven advantageous for applications in dust filter bags:

40 wt. % PET fiber with an average fiber diameter of 9.1 μm (corresponding to 0.9 dtex) and a staple length of 40 mm,
  40 wt. % bi-component PET melt bonding fiber with an average fiber diameter of 14.2 μm (corresponding to 2.2 dtex) and a staple length of 40 mm,
  10 wt. % PET fiber with an average fiber diameter of 17.4 μm (corresponding to 3.3 dtex) and a staple length of 60 mm,
  10 wt. % PET fiber with an average fiber diameter of 24.9 μm (corresponding to 6.7 dtex) and a staple length of 60 mm.

This mixture is blended homogeneously and a card web with approximately 60 g/sqm basis weight is produced from it. The card web is subsequently subjected to one-sided needling and thermal hardening by means of blown-through air.

The resulting nonwoven has a one-sided densification so that a decrease in pore size is attained through the thickness of the nonwoven from the non-needled inflow side to the needled outflow side.

Alternately, two crosslappers may be used during the production of the coarse dust filter layer (A) with different fiber mixtures on the individual crosslapper, so that the pore size gradient is attained already through the fiber mixture and is optionally further enhanced by a subsequent one-sided needling.

The mixture may consist of the following for the inflow side:
  30 wt. % PET fiber with an average fiber diameter of 24.9 μm,
  30 wt. % PET fiber with an average fiber diameter of 17.4 μm,
  40 wt. % bi-component PET melt bonding fiber with an average fiber diameter of 14.2 μm, and for the outflow side:
  30 wt. % PET fiber with an average fiber diameter of 9.1 μm,
  30 wt. % PET fiber with an average fiber diameter of 12.5 μm,
  40 wt. % bi-component PET melt bonding fiber with an average fiber diameter of 14.2 μm.

This nonwoven fabric, too, is produced with a basis weight of 100 g/sqm, needled on side, on the outflow side and finally thermally hardened.

The thickness of nonwovens of this type, which are utilized as the coarse dust filter layer (A) in the inventive filter structure (E), is 1.5 to 6 mm, preferably 2.5 to 3.5 mm. This thickness is determined based on EDANA 30.5-99, method B. The air permeability is 1000 to 4000, preferably 2000 to 3000 l/sqm×sec at a differential pressure of 200 Pa.

The fine-fiber nonwovens that are utilized for the fine dust filter layer (B), which are formed, for example, according to the meltblown process, also have a fiber diameter gradient.

This is attained by selecting the manufacturing process as described, for example, in DE 199 56 368 A1. The process parameters mentioned there enhance the formation of fiber bundles, i.e., fiber conglomerates with a large diameter. For simplicity purposes, they are also referred to as fibers below.

The selected depositing of the created fibers, on the other hand, is attained with the method described in DE 199 56 368 A1 in such a way that fibers with a small fiber diameter are preferably deposited on what later becomes the outflow side of the nonwoven fabric material and fibers with larger fiber diameters are deposited preferably on what later becomes the inflow side.

The meltblown fibers that form the fine dust filter layer (B) then have an average fiber diameter in the range of 8 μm to 15 μm, preferably 10 μm to 12 μm for example on the inflow side, which is later in contact with the outflow side of the coarse dust filter layer (A). The outflow side is preferably formed of fibers that have a fiber diameter of 4 μm and less.

The basis weights of the fine dust filter layer (B) are between 20 and 190 g/sqm, preferably between 40 and 100 g/sqm, the air permeability is between 100 and 1500 l/sqm× sec, preferably between 300 and 700 l/sqm×sec.

It is now crucial for later use that the fibers on those surfaces on which the coarse dust filter layer (A) and fine dust filter layer (B) are in contact have a nearly identical diameter. In the above example the average fiber diameter on the outflow side of the coarse dust filter layer (A) was 12.2 μm. The inflow side of the fine dust filter layer (B) was formed of fibers having an average fiber diameter of 10.8 μm.

According to the invention the difference between the average fiber diameters should not exceed 20% on the layers that are in contact with one another.

The support layer (C) may be formed, for example, of a commercially available spun-laid nonwoven. It should be selected so that it has no impact on the filtering properties of the overall structure.

For the end use, for example as dust filter bags, the layers are now loosely stacked on top of one another and the inventive structure is attained by placing the outflow side of the coarse dust filter layer (A) against the inflow side of the fine dust filter layer (B). They are secured in the peripheral regions of the dust filter bag, for example by ultrasound welding, gluing, thermal welding, or hydrodynamic joining.

The fiber bundles contained in the fine dust filter layer (B) furthermore enhance the process of welding the overall combined structure in the course of the production of dust filter bags. Due to the fact that a larger fiber mass is present in the region of these bundles, the melting behavior is matched to that of the other layers. The melting away of the meltblown nonwoven fabric that can often be observed with spun-laid/meltblown/carded structure combinations in the region of the weld seams is thus prevented.

When using the material with exposed surfaces larger than one fourth of a square foot, it may also be necessary to bond the individual layers to increase the mechanical stability. This may be done, for example, by means of a thermal or ultrasound-based spot welding, however care needs to be taken that only a few connecting points are created. An advantageous number is one spot per 625 square centimeters of filter surface. However, an adhesive bonding of the individual layers to one another is conceivable as well.

The inventive multi-layer filter structure (E) that is attained in this manner can now be used in all conceivable applications for dust extraction from gases. Some examples will be mentioned below.

In the field of mobile dust extraction devices, especially vacuum cleaners, the inventive design is characterized by an equal distribution of the dust collection efficiency over time, compared to conventional structures corresponding to the prior art.

Figure 4:
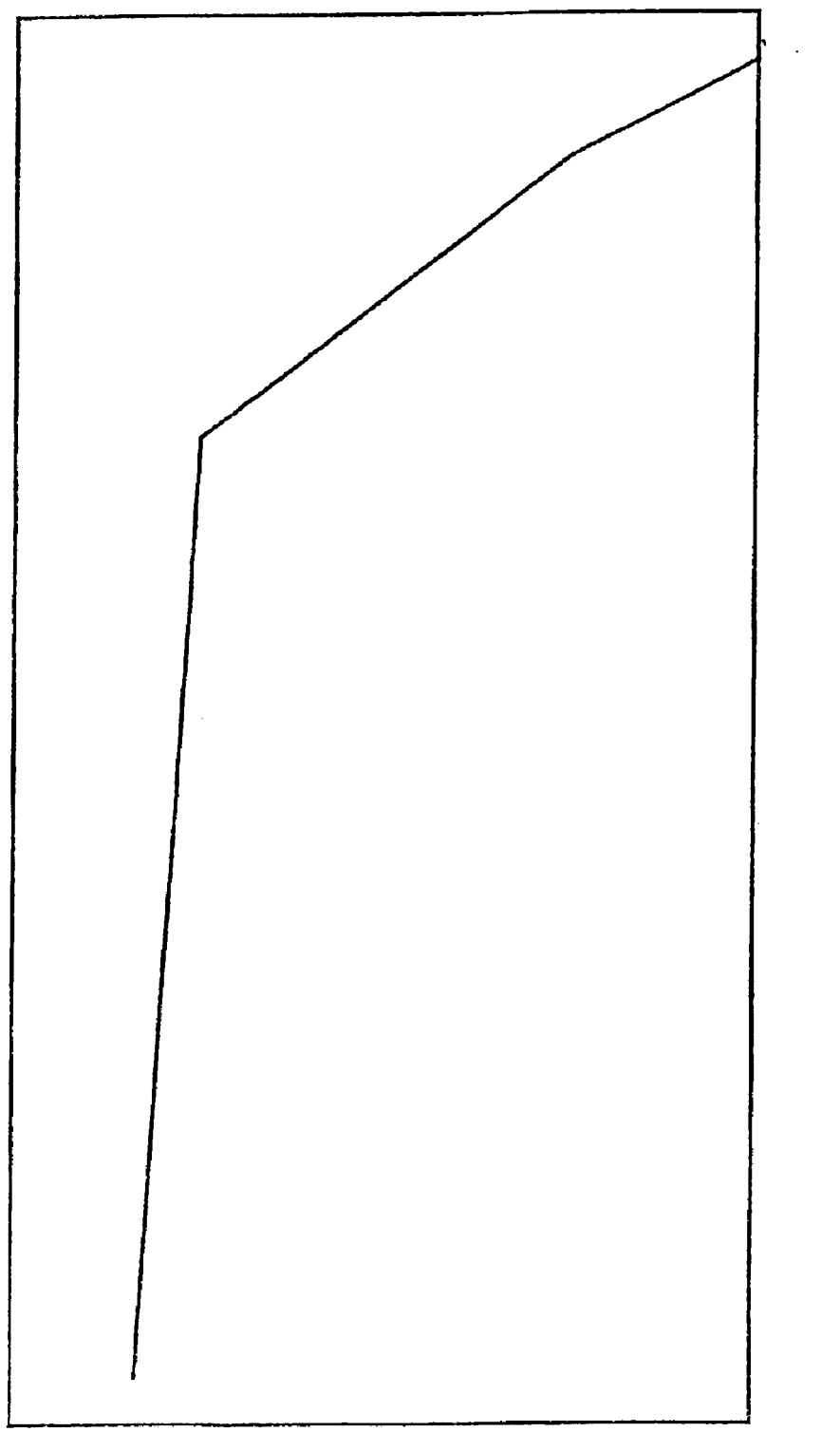
FIG. 4 is a graph showing the relationship between air permeability, that is based on the filter structure, and the dust load.

As shown in FIG. 4, which illustrates the relationship between the air permeability (measured in l/sqm×sec) that is based on the filter structure, and the dust load (measured in g), the drop in the air permeability, which is synonymous with a reduction in the cleaning power, occurs only shortly before the end of the maximally possible dust load. This is a significant advantage as compared to the known materials from which dust filter bags according to the prior art are composed. There, a significant drop in the air permeability and, hence, in the cleaning power, occurs starting at the instant of their first use. The existing vacuum cleaners, therefore, had to be built more powerful than would really be required for the given application. A vacuum cleaner which is equipped with a corresponding bag of the inventive material has a nearly constant cleaning power at the vacuum nozzle throughout the entire life of the bag.

Figure 5:
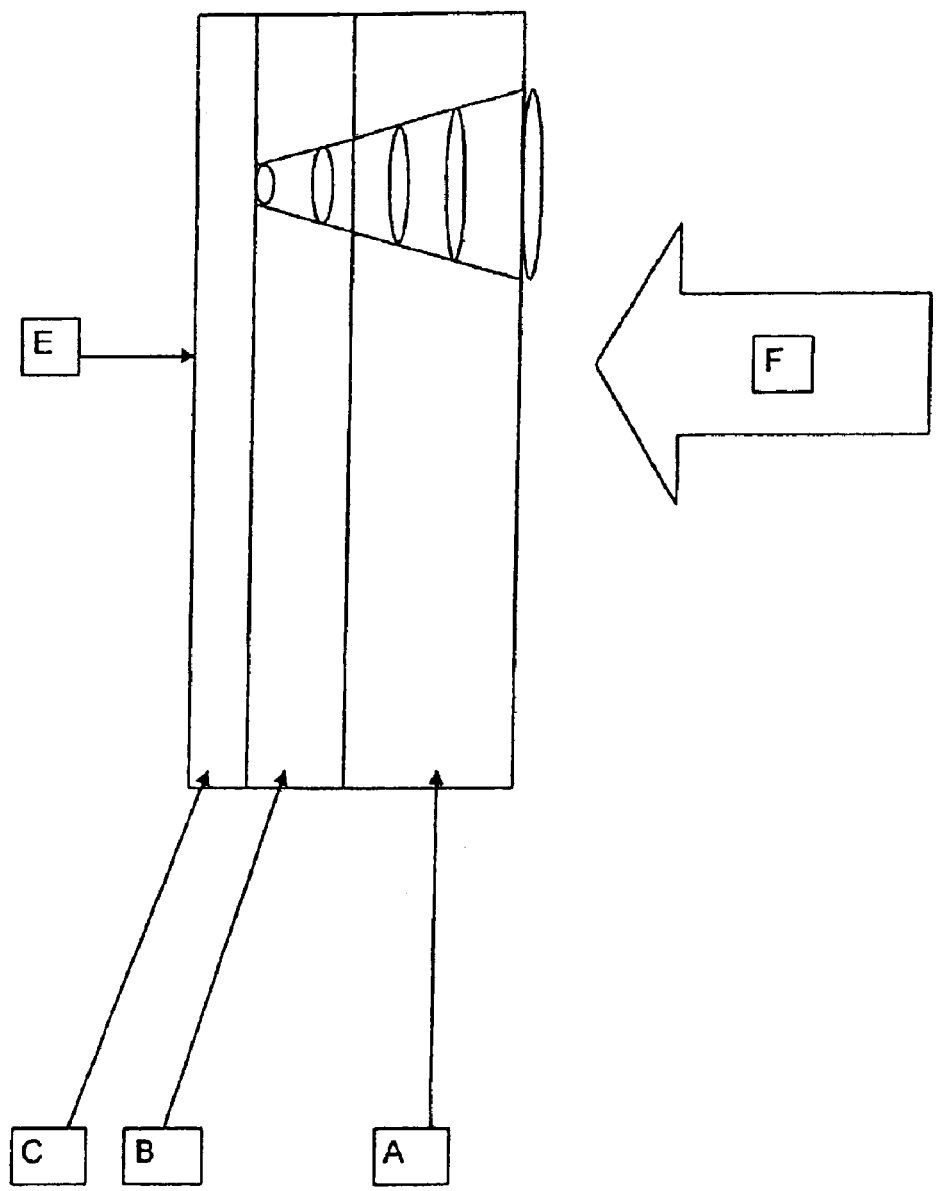
FIG. 5 is a pictorial view showing the principle of the progressive collection process.

When the inventive construction is used in the field of stationary filtration and dust extraction devices, for example in industrial ventilation and air conditioning systems, the inventive filter structure is again characterized by a prolonged serviceable life. In these cases, too, the principle of the progressive collection process, as shown in FIG. 5, is decisive for the uniformity of the dust collection efficiency over the duration of their use.

The inventive filter structure is furthermore particularly suitable for dust filter bags, pocket filter bags, pleated filters, exhaust air filter pads that are disposed especially in front or behind a vacuum cleaner turbine, as well as for air filters in motor vehicles.

What is claimed is:

1. A multi-layer filter structure (E) for the dust extraction from gases, wherein a non-metallic coarse dust filter layer (A), a non-metallic fine dust filter layer (B), and a non-metallic support layer (C) are disposed behind one another from the inflow side to the outflow side, wherein the fiber diameter distribution within each of the coarse dust filter layer (A) and fine dust filter layer (B) has a gradient wherein the fiber diameters within the coarse dust filter layer (A) and within the fine dust filter layer (B) continually decrease from the inflow side to the outflow side; and wherein the difference between the adjacent fiber diameters of the coarse dust filter layer (A) and the fine dust filter layer (B) in the direction of inflow in the region of the contacting surfaces is less than 20%.

2. A multi-layer filter structure (E) according to claim 1, wherein the fiber diameters of the fine dust filter layer (B) in the region of the surface that is in contact with the coarse dust filter layer (A) are identical to the fiber diameters of the coarse dust filter layer (A) in this region.

3. A multi-layer filter structure (E) according to claim 1, wherein the coarse dust filter layer (A) is composed of a nonwoven non-metallic staple-fiber having a fiber diameter gradient.

4. A multi-layer filter structure (E) according to claim 1, wherein the coarse dust filter layer (A) consists of a carded nonwoven, which is needled on one side and thermally hardened, which is composed of randomly oriented curled staple fibers comprising a first synthetic staple fiber with a first fiber fineness and at least one second synthetic staple fiber with a second fiber fineness.

5. A multi-layer filter structure (E) according to claim 1, wherein the fine dust filter layer (B) is composed of a meltblown nonwoven having a fiber diameter gradient.

6. A multi-layer filter structure (E) according to claim 1, wherein the basis weight of the coarse dust filter layer (A) is in the range of 40 to 500 g/sqm.

7. A multi-layer filter structure (E) according to claim 1, wherein the basis weight of the fine dust filter layer (B) is in the range of 20 to 190 g/sqm.

8. A multi-layer filter structure (E) according to claim 1, wherein the basis weight of the support layer is in the range of 10 to 50 g/sqm.

9. A multi-layer filter structure (E) according to claim 1, wherein the thickness of the coarse dust filter layer (A) is between 1.5 and 6 mm.

10. A multi-layer filter structure (E) according to claim 1, wherein the air permeability of the coarse dust filter layer (A) is between 1000 and 4000 l/sqm×sec.

11. A multi-layer filter structure (E) according to claim 1, wherein the coarse dust filter layer (A), the fine dust filter layer (B) and the support layer (C) are created from thermoplastic polymers.

12. A multi-layer filter structure (E) according to claim 3, wherein the staple fibers of the coarse dust filter layer (A) have an average fiber diameter of 8.0 to 40.0 μm.

13. A multi-layer filter structure (E) according to claim 1, wherein the fibers of the coarse dust filter layer (A) and/or fine dust filter layer (B) are provided with an additive that enhances their electrostatic charge.

14. A multi-layer filter structure (E) according to claim 1, wherein the fibers of the coarse dust filter layer (A) and/or fine dust filer layer (B) are provided with an antimicrobial additive.

15. A method comprising the step of:

placing a multi-layer filter structure (E) according to claim 1 in a stationary or mobile dust cleaning device.

16. A dust filter bag, having a wall which consists of a multi-layer filter material according to claim 1.

17. A pocket filter bag, characterized in that its wall consists of a multi-layer filter material according to claim 1.

18. A pleated filter, having a wall which consists of a multi-layer filter material according to claim 1.

19. An exhaust air filter pad that is disposed in front of and/or behind a vacuum cleaner turbine, having a multi-layer filter material according to claim 1.

20. An air filter for motor vehicles, having a multi-layer filter material according to claim 1.

* * * * *